(No Model.) 2 Sheets—Sheet 1.

J. A. CHAMBERS.
HAND PLANTER.

No. 544,720. Patented Aug. 20, 1895.

Witnesses
Chas. A. Ford.
H. J. Riley

Inventor
John A. Chambers,
By his Attorneys,
C. A. Snow & Co.

(No Model.) 2 Sheets—Sheet 2.
J. A. CHAMBERS.
HAND PLANTER.
No. 544,720. Patented Aug. 20, 1895.
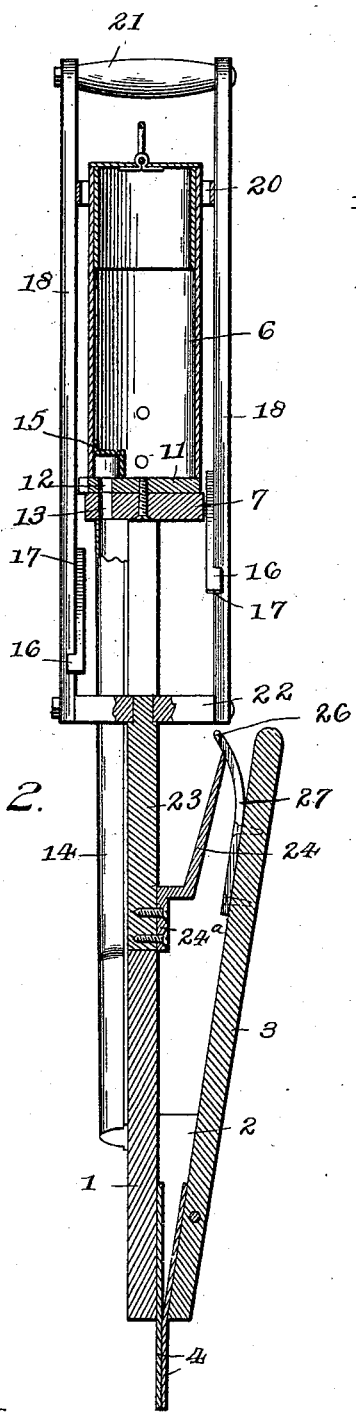
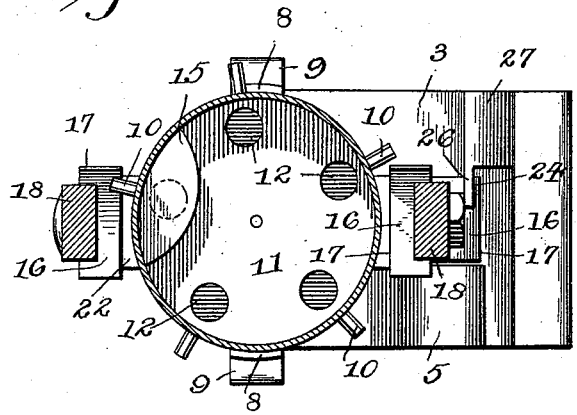
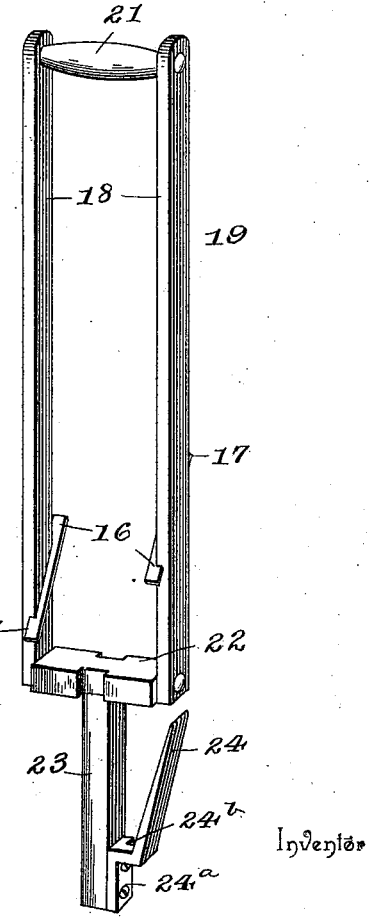
Witnesses
Chas. A. Ford.
J. F. Riley.
By his Attorneys,
C. A. Snow & Co.
Inventor
John A. Chambers

UNITED STATES PATENT OFFICE.

JOHN A. CHAMBERS, OF NEWBURG, ASSIGNOR OF ONE-HALF TO ROBERT MERIWETHER, OF ROLLA, MISSOURI.

HAND-PLANTER.

SPECIFICATION forming part of Letters Patent No. 544,720, dated August 20, 1895.

Application filed January 31, 1895. Serial No. 536,823. (No model.)

*To all whom it may concern:*

Be it known that I, JOHN A. CHAMBERS, a citizen of the United States, residing at Newburg, in the county of Phelps and State of Missouri, have invented a new and useful Hand-Planter, of which the following is a specification.

The invention relates to improvements in hand-planters.

The object of the present invention is to simplify and improve the construction of hand-planters, and to provide one capable of depositing seed in the ground by simply the upward and downward movements incident to placing the blades of the planter in the ground and lifting them therefrom, and to avoid the necessity of requiring the operator to assume any awkward, inconvenient, or tiresome position in planting, such as carrying the planter directly in front of him.

Another object of the invention is to provide such a planter which may be readily operated by either one hand or both, and which, during the operation of planting, may be carried naturally at the side of the operator.

The invention consists in the construction and novel combination and arrangement of parts hereinafter fully described, illustrated in the accompanying drawings, and pointed out in the claims hereto appended.

Figure 1:
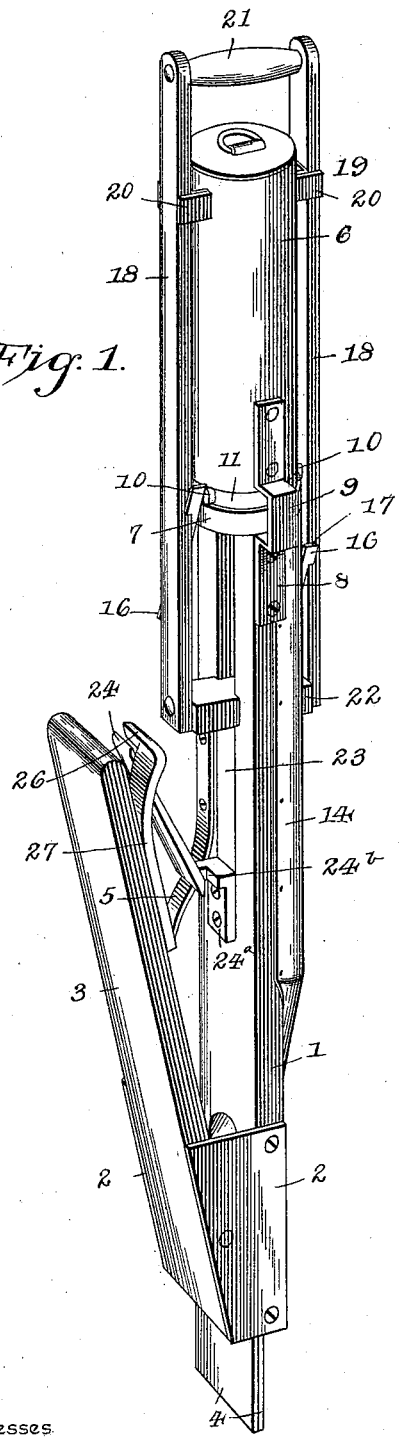
Figure 5:
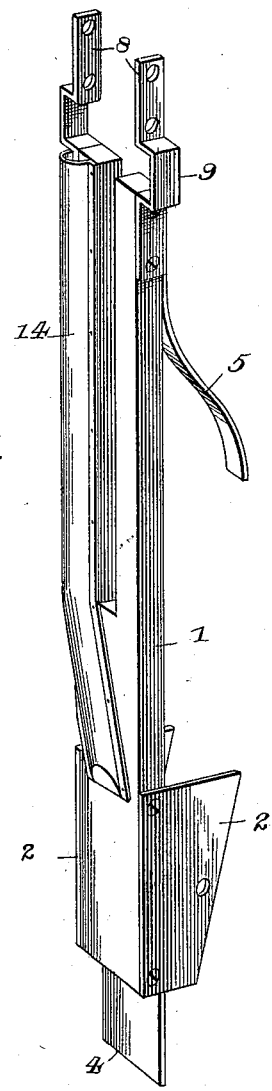

In the drawings, Figure 1 is a perspective view of a hand-planter constructed in accordance with this invention. Fig. 2 is a vertical longitudinal sectional view of the same. Fig. 3 is a horizontal sectional view. Fig. 4 is a detail perspective view of the reciprocating frame. Fig. 5 is a similar view of the rigid leg.

Like numerals of reference indicate corresponding parts in all the figures of the drawings.

1 designates a rigid leg, and hingedly connected therewith, by means of plates 2, is a movable leg 3. These legs are provided at their lower ends with the usual blades 4. The latter are adapted to penetrate the ground and to be separated therein to deposit corn or other seed. The blades are normally held in contact or closed by means of a spring 5, interposed between the legs above the plates 2 to prevent any seed which may be between the legs in the space inclosed by the side plates 2 from dropping upon the surface of the ground when the plates are above the latter.

On the upper end of the rigid leg 1 is mounted a cylindrical hopper 6, which is supported above a bottom disk or plate 7 by means of metal braces 8, having their terminals secured to the side edges of the leg 1 and to opposite sides of the hopper. The braces 8 have centrally-offset portions 9, and provide spaces to permit oppositely-beveled lugs or teeth 10 of a rotating disk 11 to pass unobstructedly. The rotating disk 11 is provided with an annular series of openings or seed-cups 12, and is mounted on the upper face of the bottom disk or plate 7, and its openings or seed-cups are adapted to register successively with a discharge-opening 13 of the bottom plate or disk 7 to drop seed into a seed-tube 14. The seed-tube 14 is mounted on the rigid leg 1 and extends from the bottom plate or disk to an opening in the leg communicating with the space inclosed by the plates 2. Within the hopper is arranged a flexible cap or brush 15, mounted above the discharge-opening of the bottom plate or disk 7 and adapted to shut off the bulk of the seed from the discharge-opening in the usual manner, and is preferably constructed of rubber to avoid injuring any seed.

The lugs or teeth 10 are arranged at regular intervals on the periphery of the rotating seed-disk 11, and are oppositely tapered or beveled, and are adapted to be engaged by inclined shoulders 16, formed by plates 17, disposed at opposite sides of the seed-disk and arranged at different elevations in order to engage the lugs or teeth successively. The inclined plates are located on and project from the inner faces of sides 18 of a reciprocating frame 19, mounted for vertical movement on the rigid leg. As the reciprocating frame moves downward, incident to inserting the planter in the ground, one of the inclined shoulders of the plates engages an adjacent lug or tooth 10 and the seed-disk is partially rotated; and the upward movement of the reciprocating frame, incident to lifting the planter out of the ground, causes the other inclined shoulder to engage an adjacent lug or cog and again partially rotate the seed-disk. By this means the seed-disk, during the operation of planting, is continuously rotated, and the rotation is caused by the movement of raising and lowering the planter, and the latter may be operated by either hand and does not require experience.

The reciprocating frame is substantially rectangular, and is composed of the sides 18, which are arranged in suitable ways 20 of the hopper, a handle bar or piece 21 connecting the upper ends of the sides, and a lower cross-piece 22, arranged in a vertical slot or opening of the leg 1 and slidingly connected therewith and having opposite notches to receive the leg.

Depending from the reciprocating frame is a centrally-arranged stem or arm 23, which carries an inclined bar or arm 24, arranged to engage a projection 26 of the hinged leg 3 on the upward movement of the reciprocating frame, whereby the blades are separated in the ground. The arm 24 is inclined outward, and its lower portion or bracket 24ª clears the projection 26 on the downward movement of the frame, and is provided with a recess 24ᵇ to permit the projection to leave the arm after separating the blades.

The projection 26 is arranged at the upper extremity of an inwardly-inclined arm 27, and when the reciprocating frame is in its lowermost position the upper or outer end of the inclined arm 24 is located directly beneath the lateral projection 26, which is horizontally disposed, and the upward movement of the frame serves to separate the blades by drawing the upper portion of the hinged leg inward. This separation of the blades takes place before the reciprocating frame has reached the limit of its upward movement, thereby causing the separation of the plates to take place in the ground, and the planter is not lifted out of the ground until the plates have again closed by the action of the spring. The hopper is provided with a removable cover, which may be mounted on the upper end or top in any desired manner.

It will be seen that the planter is exceedingly simple and inexpensive in construction, that it is positive and reliable in operation, and may be operated with one hand and carried at the side to avoid any inconvenience in handling it. It will also be apparent that the dropping mechanism is positive and reliable and that positive means are employed for opening and closing the blades in the ground, thereby effectively planting the seed.

It will be readily understood that the hand-planter may be readily employed for planting various kinds of seed—such as corn, sorghum, or the like—that the seed-disk may be readily removed in order that another one may be employed having a different size of seed-cup to accommodate any change in the planting, and that changes in the form, proportion, and the minor details of construction may be resorted to without departing from the principle or sacrificing any of the advantages of the invention.

What I claim is—

1. In a hand planter, the combination of a pair of hingedly connected legs, a hopper mounted on one of the legs, a rotating seed disk, and a reciprocating frame mounted on one of the legs and carrying the handle of the planter, and engaging the seed disk and the other leg, whereby the seed disk is rotated and the lower ends of the legs separated, substantially as and for the purpose described.

2. In a corn planter, the combination of a leg, a hopper mounted thereon, a rotating seed disk mounted at the bottom of the hopper and provided at intervals around its entire periphery with lugs or cogs, and a reciprocating frame having parallel sides and provided with oppositely disposed inclined shoulders arranged on the inner faces of the sides to engage alternately the lugs or cogs, whereby the seed disk is continuously rotated, substantially as described.

3. In a hand planter, the combination of a pair of legs hingedly connected, one of the legs being rigid, and the other being movable, a hopper provided at its bottom with a rotary seed disk, a reciprocating frame engaging and rotating the seed disk and having an inclined shoulder engaging the movable leg above the point of hinging and adapted to separate the lower ends of the legs, and a spring interposed between the upper portions of the legs to close the lower ends of the same, substantially as described.

4. In a hand planter, the combination of a pair of legs hingedly connected, one of the legs being movable and the other rigid, a hopper mounted on the rigid leg and having a rotary seed disk provided with peripheral lugs, and a reciprocating frame mounted on the rigid leg and provided with reversely arranged inclined shoulders for engaging the peripheral lugs and having an inclined shoulder for engaging the movable leg, substantially as described.

5. The combination of the rigid and movable legs hingedly connected, a hopper mounted on the rigid leg, a rotary seed disk provided with peripheral lugs, a reciprocating frame mounted on the rigid leg and provided with reversely arranged oppositely disposed inclined shoulders to engage the peripheral lugs and having an upwardly and outwardly inclined arm, and a projection arranged on the movable leg and arranged to be engaged by the inclined arm, substantially as described.

6. The combination in a planter, of a rigid leg provided with a longitudinal opening, the bottom disk mounted at the top of the rigid leg, a hopper arranged on the rigid leg and located above the bottom disk, braces supporting the hopper, a rotary seed disk provided with peripheral lugs, a movable leg hinged to the rigid leg and carrying a horizontal projection, a seed tube extending from the bottom plate to the space between the lower ends of the legs, a rectangular frame guided on the rigid leg and the hopper, and
5 provided with a depending stem arranged in the longitudinal opening of the rigid leg, said rectangular frame being provided at its sides with reversely arranged inclined shoulders for engaging the lugs of the seed disk, a
10 spring interposed between the legs for holding the lower ends of the latter closed, and an inclined arm mounted on the depending stem of the rectangular frame and provided at its base with a recess to form a passage for the projection of the movable leg, substantially 15 as described.

In testimony that I claim the foregoing as my own I have hereto affixed my signature in the presence of two witnesses.

JOHN A. CHAMBERS.

Witnesses:
   S. H. MASK,
   W. D. JONES.